Feb. 19, 1924.

W. R. McGOWEN

AUTOMOBILE BUMPER

Filed Aug. 2, 1922

1,484,035

Inventor
William R. McGowen
By

Patented Feb. 19, 1924.

1,484,035

UNITED STATES PATENT OFFICE.

WILLIAM R. McGOWEN, OF CHICAGO, ILLINOIS, ASSIGNOR TO AMERICAN BUMPER CO., OF CHICAGO, ILLINOIS, A CORPORATION OF ILLINOIS.

AUTOMOBILE BUMPER.

Application filed August 2, 1922. Serial No. 579,106.

*To all whom it may concern:*

Be it known that I, WILLIAM R. Mc-GOWEN, a citizen of the United States, and a resident of Chicago, in the county of Cook and State of Illinois, have invented certain new and useful Improvements in Automobile Bumpers, of which the following is a specification.

This invention relates to improvements in automobile bumpers, and more particularly to that type disclosed in my prior Letters Patent No. 1,411,052, dated March 28, 1922, and characterized as a resilient bar bumper having a flexible impact member in the form of a chain extending lengthwise intermediate the end portions of the bumper.

The object of the invention is to provide an improved construction for bumpers of the character above described and embodying a departure in the treatment of the material during the process of manufacture, whereby certain advantageous results are obtained which are calculated to increase the capacity of the bumper to resist the shock of impact. The means employed for accomplishing the desired results are hereinafter fully disclosed and illustrated in the accompanying drawings, wherein—

Figure 1:
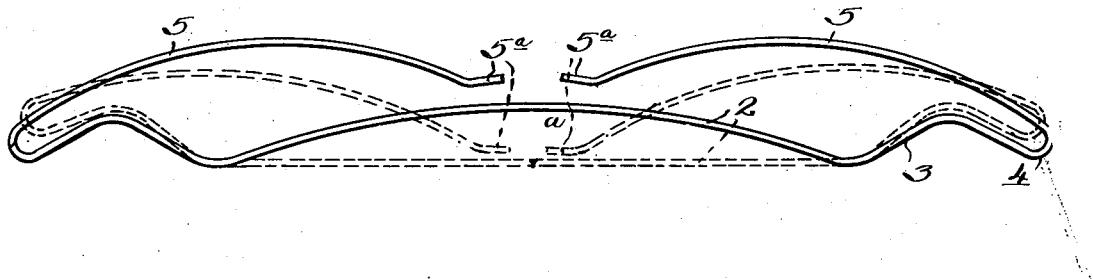
Figure 2:
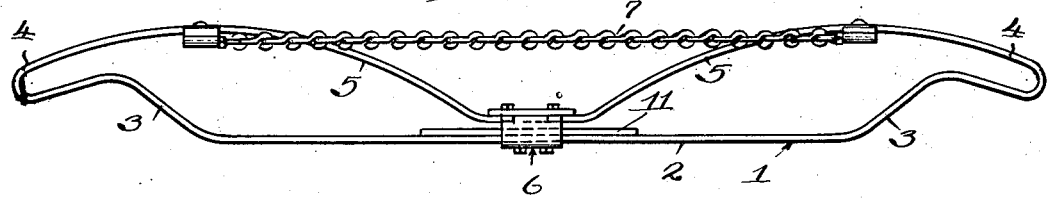
Figure 3:
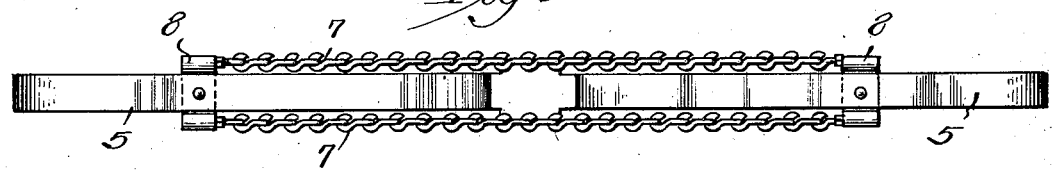
Figure 4:
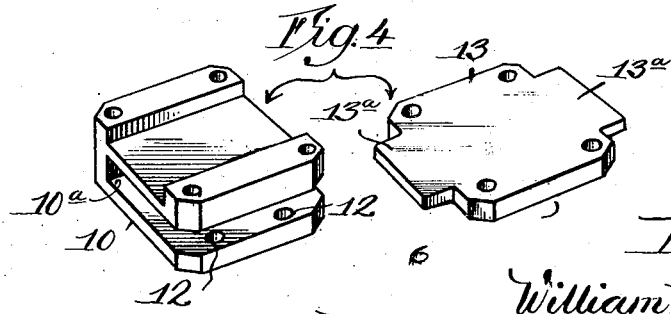

Figure 1 is a top plan view of a bar bent in its initial shape, the dotted line figure showing the same in its ultimate or final shape, Figure 2 is a top plan view of the bumper completely assembled for attachment, Figure 3 is a view in front elevation of the complete bumper, and Figure 4 is an enlarged perspective view of the central clamping member removed.

Considering first the general structural features of the bumper, as disclosed in Figures 2 and 3, the main element is a single bar 1 of spring steel bent or shaped according to the following scheme: A straight portion 2, shorter than the overall length of the bumper extends across the rear of the bumper and forms the rear or reinforcing bar. To this portion 2 of the bar and near its ends are secured suitable clamping members for mounting the bumper upon the ends of the vehicle frame members in the usual manner.

Beyond the rear portion 2 the bar is symmetrically shaped with relatively short inclined portions 3—3 bearing forwardly and outwardly, and merging into U-shaped end sections 4—4 bent forwardly and inwardly, the free end or forwardly disposed portions 5—5 extending inwardly from the end sections in sweeping curves toward the central point of the rear portion 2. The extremities 5ª—5ª of the free end portions 5—5 are straightened and terminate in spaced relation, and are further anchored in place by means of a clamp or block 6 secured at the central point of the rear portion 2. Guideways are provided in this block in which the ends 5ª—5ª may slide freely under the force of any impact tending to flex the free end portions 5—5 to approach a straight line. The structure of this block will hereinafter be described more in detail.

Connecting the free end portions 5—5 at points substantially intermediate their ends is the flexible impact member consisting preferably of two parallel lengths of chain 7—7 spaced just above and below the bar 1 and secured thereto by means of transverse attaching plates 8—8 bolted to the free end portions 5—5 inwardly from the ends of the bumper, and provided with suitable connections for ends of the chains 7—7. From the foregoing it will be observed that the central impact receiving portion of the bumper consists of the chains 7—7 (which together form a widened area extending throughout the central portion of the bumper) and the forward portions of the impact sections 4—4. The chains 7—7 being flexible rather than resilient, are therefore only capable of transmitting the impact received against them to the resilient structure to which they are secured, the force being absorbed first by the flexing of the free end sections 5—5, and finally, by the resistance offered by the rear portion 2, to the force transmitted thereto through the centrally anchored ends of the free end portions 5—5.

From this explanation it will be at once manifest that the rear portion 2 of the bar, in order to effectively resist and absorb the shocks transmitted to it, should be treated in such a manner as to increase its inherent capacity to resist flexing in a rearward direction. Furthermore, it is desirable that the rear portion be treated so as to exert a constant tension on the chains in order to keep them taut under normal conditions, and to eliminate the possibility of their sagging due to the development of a permanent distortion in the resilient bar.

It is for these reasons that the resilient bar is treated in the manner now to be described, and embodying the present invention. As clearly shown in Figure 1, the bar 1, during the process of shaping, is given a pronounced forward curvature throughout the rear portion 2, the arc of curvature being preferably measured by the distance from its central point to a corresponding point on the chord connecting the ends of the curve, to-wit; along the line *a—a*. In a full sized bumper this distance would be approximately three (3) inches, although this could be increased or decreased as conditions require. Superimposed upon the full line representation of the bar, with the curvature therein, is a dotted line figure showing the bar flexed into its ultimate position as would be the case when the chains are applied and the free ends anchored within the block 6. Thus it will be seen that in assembling the bumper the chains draw the end portions inwardly so that the rear bar assumes a straight line, the end portions 4—4 are thrown forwardly, and the free ends 5—5 carried toward the central point of the rear bar, there being a pivoting action at the ends of the said bar 2 where the attaching brackets are ultimately mounted.

The result of introducing the initial curvature in the rear portion 2 is to greatly increase the potential strength of that portion, even though it ultimately assumes a straight line position, it being a well known fact that a greater force is required to flex or curve this portion of the bar from straight line position into an arc of reversed or rearward curvature, than if the bar were initially straight. It follows, therefore, that under impact the rear portion will exert a materially greater resistive effort, and hence a much greater shock can be absorbed without permanently distorting the bar, and before transmitting the force to the frame of the vehicle.

Such treatment is of especial advantage in a bumper employing flexible impact members, inasmuch as the potential effort of the rear bar to resume its initial curvature is exerted at the ends of the chains, placing them under constant tension, thus maintaining them taut and without sagging.

The central clamping member or block 6 herein referred to provides a convenient means for retaining the ends of the free end portions 5—5 of the bar. It consists of a metallic block 10 having an open slot 10ª extending lengthwise thereof. This block straddles the rear portion 2 of the bar and also a short reinforcing bar 11 lying along the inner face of the bar 2. Cap screws are inserted from the rear of the block through holes 12—12, thus clamping the block in fixed position. In the forward face of the block 10 is a transverse slot forming the guideway for the ends of the free end portions 5—5 of the bar. A cover plate 13 is finally applied to the block by means of screws passing through registering holes at the corners of the block and plate, the latter being preferably extended lengthwise by the provision of ears 13ª—13ª, which act to conceal the ends of the bar and to cover up the scratch marks thereon acquired by reason of the contact between the bar and the block. The ears are preferably reduced in thickness. By providing a block of this form, the same may be clamped in place independently of the ends to be guided therein, thus affording a more convenient construction and presenting a neater appearance.

Having set forth the structure embodying the invention, and the advantages derived therefrom, I claim:

1. An automobile bumper comprising a resilient bar bent forwardly and inwardly at its ends to form forwardly disposed free end portions, and a flexible impact member connecting said free end portions, said bar being initially curved forwardly intermediate its ends.

2. An automobile bumper comprising a resilient bar bent at its ends to form inwardly extending free end portions, and a flexible impact member connecting said free end portions, the portion of said bar intermediate said free end portions being initially curved in a forward direction, and finally flexed into a straight line position.

3. An automobile bumper comprising a resilient bar bent to form U-shaped end portions, an intermediate rear portion and forwardly disposed free end portions terminating adjacent the central portion of said rear portion, and a flexible impact member connecting said free end portions, said rear portion being initially bent to introduce a forward curvature therein.

4. An automobile bumper comprising a resilient bar initially bent to form U-shaped end portions, and forwardly disposed inwardly curved free end portions, and an outwarly curved rear portion intermediate said end portions.

5. A resilient bar bumper comprising a single bar bent to form a rear portion, U-shaped end portions and forwardly disposed free end portions, said rear portion being initially curved forwardly in an arc of predetermined curvature, and a flexible impact member connecting said free end portions, and flexing said curved rear portion into straight line position.

6. An automobile bumper comprising a resilient bar bent forwardly and inwardly to form substantially U-shaped end sections and forwardly disposed free end portions, curving inwardly toward the central portion of said bar, the rear portion thereof being curved forwardly, and a flexible impact member connecting said free end portions inwardly from the ends of the bumper, and held under tension by the flexing of said rear portion into a straight line position.

7. An automobile bumper comprising a resilient bar bent to form a forwardly curved rear portion, U-shaped end portions and forwardly curved free end portions terminating adjacent the central portion of said rear portion, and a flexible impact member connecting said free end portion inwardly from the ends of the bumper, whereby said rear portion is flexed into a straight line position and said impact member held under a constant tension.

In witness whereof, I hereunto subscribe my name this 31st day or July, A. D., 1922.

WILLIAM R. McGOWEN.